Nov. 1, 1966  A. BAER ETAL  3,281,954
FREEZE-DRYING APPARATUS
Filed June 7, 1965  9 Sheets-Sheet 6

Nov. 1, 1966  A. BAER ETAL  3,281,954

FREEZE-DRYING APPARATUS

Filed June 7, 1965  9 Sheets-Sheet 8

United States Patent Office 3,281,954
Patented Nov. 1, 1966

3,281,954
FREEZE-DRYING APPARATUS
Arnold Baer, Fontenay-aux-Roses, and Marcel Tribout, Orly, France, assignors to Compagnie Francaise Thomson-Houston, Paris, France, a corporation of France
Filed June 7, 1965, Ser. No. 462,030
Claims priority, application France, June 8, 1964, 977,448, Patent 1,406,556
16 Claims. (Cl. 34—92)

This invention relates to apparatus for subjecting materials to processes of the general class including vacuum distillation, vacuum-evaporation, vacuum-drying and the like. It is more especially directed to freeze-drying apparatus.

Freeze-drying processes have in recent years assumed an increasing importance in many branches of industry and commerce as a means of thoroughly removing the liquid constituents from various materials without affecting any of the other physical, chemical (and in many cases biological) characteristics thereof. Basically, a freeze-drying process involves cooling the material to freeze the liquid constituents, usually water, therein, exposing the frozen material to a vacuum and applying controlled heat. The frozen liquid constituent is thereby caused to sublimate, that is, pass directly from the solid to the vapor phase without going through the liquid state.

It is a characteristic of the freeze-drying process that the physical structure and chemical properties of the solid constituents of a freeze-dried material are preserved to a degree unattainable with any other method of drying or dehydration, so that the simple addition of the original liquid to the freeze-dried product at some later time restores the material to a condition which in many cases is indistinguishable from its initial state. The process is therefore especially valuable for the preservation of delicate organic substances, including both biological and pharmaceutic substances, and foodstuffs. It is also useful in connection with inorganic materials in certain instances.

Conventional freeze-drying apparatus for liquid and semi-liquid substances generally comprises a series of shallow containers in the form of shelves or trays of relatively large surface area and shallow depth, in which the batches of the substance to be processed are subjected to the requisite pressure and temperature conditions. The wide, shallow geometry of the containers is necessary in order to provide the large surface area indispensable for good efficiency of sublimation (or evaporation) and heat transfer. This geometry, however, brings with it considerable practical difficulties. A larger number of such shallow containers have to be provided and handled simultaneously if the plant is to have an acceptably high output rate for industrial purposes. Filling the containers with accurately metered batches of material involves tedious metering operations at the charging station. Shifting the many shallow containers about from one to another of the many stations involves, as from the charging station through a freezing, evacuating, discharging and cleaning stations and back to the charging station, has required the provision of extensive and precise conveyor machinery. Careful handling was necessary to avoid spilling and avoid contamination of the contents. The plant occupied considerable floor space. Because of the highly hygroscopic character of the freeze-dried product and the need to avoid contamination, the atmosphere throughout that considerable space had to be accurately controlled as to its degree of dryness and purity. A high degree of automation was practically impossible to achieve in a process of this nature. Furthermore, in certain applications the quality of the final product was impaired as a result of the extensive handling to which it was subjected during processing.

All this has considerably increased the costs involved in constructing, maintaining and operating freeze-drying plant and detracted from the economy of the process.

The above considerations apply in general to any vacuum process in which batches of liquid or semi-liquid material have to be treated in wide, shallow containers.

Objects of this invention are to provide improved vacuum-processing and more specifically freeze-drying plant possessing the following advantageous features:

High compactness, whereby the entire plant, including accessories, can be housed in a relatively small enclosure;

Elimination of conveyor mechanisms, wheeled trucks and similar means for moving the containers from one station to another;

Ready automation;

Provision for rapid, accurately-metered charging of all the containers simultaneously, followed by exposure to prescribed vacuum and temperature conditions, all in a common first position, and then discharge of the processed product, followed if desired by a cleaning of the emptied containers, in a second position;

Provision for bodily rotating an assembly of stacked, parallel-spaced containers between the two positions referred to in the preceding paragraph over an arc of 90°, whereby in said first position the tray-like containers extend horizontally and are stacked vertically for being easily and quickly filled with metered charges of material through cascading overflow down the containers of the stack, while in said second position the containers extend vertically and are spaced horizontally for being easily and quickly discharged of their contents into underlying receiver means, and flushed clean if desired.

A further object of the invention is to provide a stack of improved tray-like containers for freeze-drying and other vacuum processes, incorporating improved overflow means and built-in flow means for temperature control fluids.

The above and further objects of the invention will appear from the ensuing description of exemplary apparatus constructed in accordance with the invention, with reference to the accompanying drawings, wherein.

Figure 1:
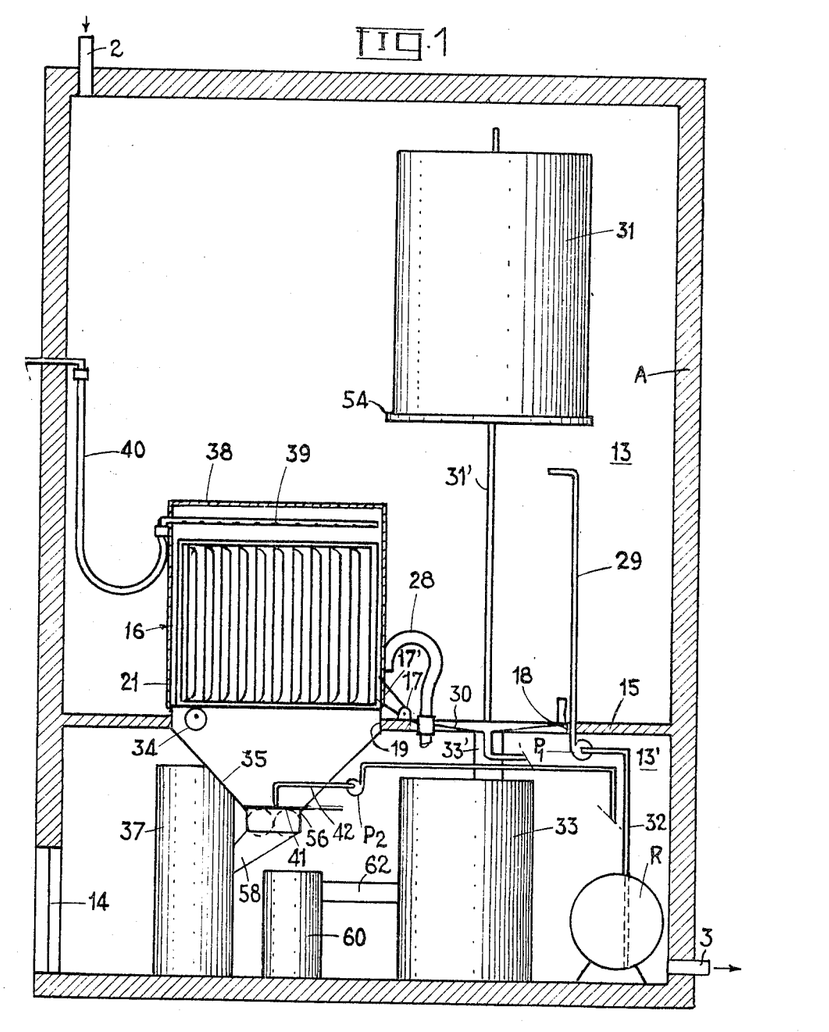
FIG. 1 is a simplified view in elevation and partly in section, of a freeze-drying installation according to a first embodiment of the invention, with the tray assembly rotated to its tilted, discharging-and-flushing position; and the washing hood lowered thereover.
Figure 2:
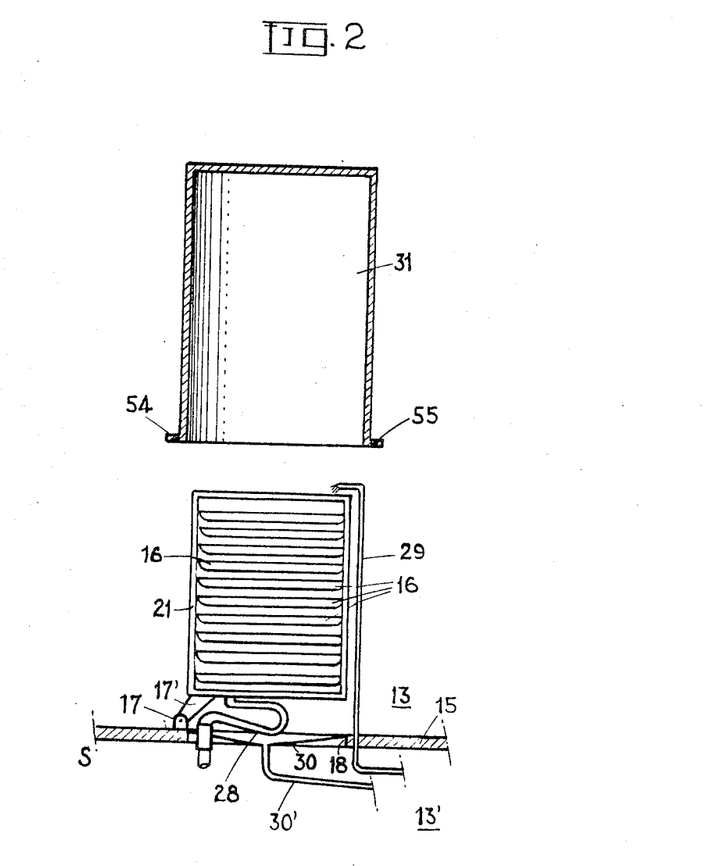
FIG. 2 is a sectional view showing part of the same installation as in FIG. 1, with the tray assembly in its upright, charging-and-processing position and with the vacuum hood thereof lifted to its raised position.

As shown in FIGS. 1 and 2, the entire freeze-drying plant of the invention is contained within a relatively small enclosure A, such as a box-shaped cubicle.

Owing to the limited size of this enclosure, a suitably conditioned atmosphere can be easily and economically maintained therein, for which purpose there is shown an inlet 2 connectable to a source of dry, clean air, and an outlet 3. As earlier explained, the invention is especially suitable for the freeze-drying of food products and pharmaceutical compositions. In such applications it is important to maintain a controlled atmosphere which will avoid re-humidifying the dehydrated product as well as contaminating the substance at any stage of the process.

The enclosure A is divided by means of a horizontal partition 15 into an upper chamber 13 and a lower chamber 13'. Broadly the upper chamber 13 serves to contain the assembly of stacked shallow containers or trays, generally designated 16, containing the substance to be processed as later described, while the lower chamber 13' serves to house a store of said substance (R) as well as ancillary equipment, also later described in detail.

The container assembly 16 includes a generally rectangular frame 21 in which is supported a stack of spaced parallel tray-like containers or shelves as will be presently described in greater detail. The frame 21 is supported for pivotal movement about a horizontal axis between the positions respectively shown in FIGS. 1 and 2. For this purpose one or more arms such as 17' projecting from a corner of frame 21 are pivoted to brackets such as 17 upstanding from the horizontal partition 15.

In the upright position of the frame 21 shown in FIG. 2, the stacked trays 16 lie in vertically spaced horizontal planes, so that they can be filled with metered charges of material to be processed, and exposed to the requisite pressure and temperature conditions for processing the material as will be presently made clear.

Figure 4:
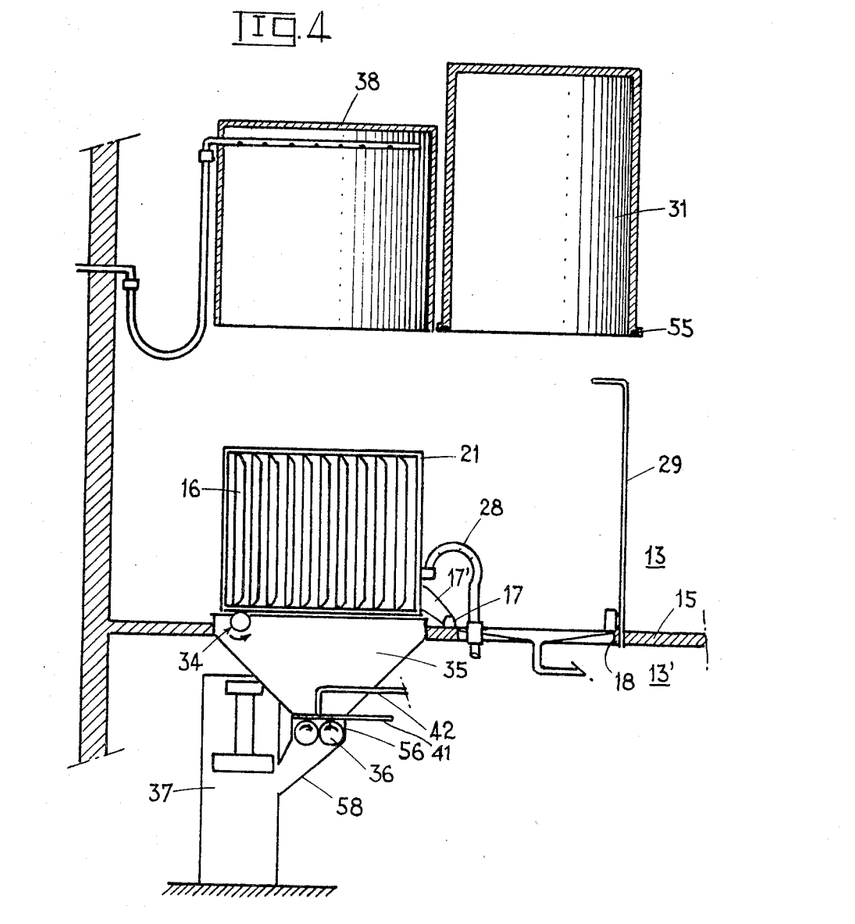
FIG. 4 is another partial view of the same installation, with the tray assembly in its tilted position as in FIG. 1, but with both the washing and vacuum hoods raised.

On the other hand, in the tipped position of the frame 21 shown in FIGS. 1 and 4, the stacked trays 16 lie in horizontally spaced vertical planes, so that their contents, such as dehydrated solids, can easily be discharged from the trays into underlying receiving means, and the trays then be flushed clean.

Figure 3:
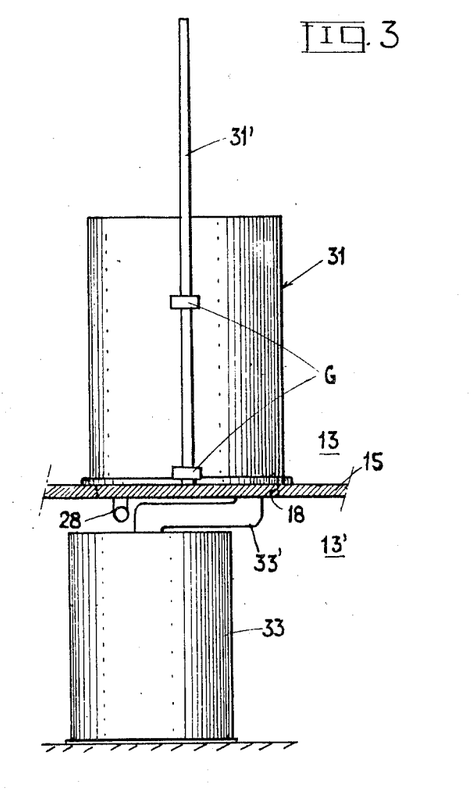
FIG. 3 is a partial view generally on a vertical plane at right angles to FIG. 2, but with the vacuum hood lowered over the tray assembly, and further showing the condenser unit and its vacuum connection with the lowered hood.

An inverted bell or vacuum hood 31 is slidable on vertical guide means 31' between an upper position (FIGS. 1, 2 and 4) in which its base is at an elevation to clear the arcuate path of the tray assembly 16 during its pivotal displacement, and a lower position (FIG. 3) in which sealing flanges 54 surrounding the open lower end of hood 31 tightly engage the upper surface of partition 15. Suitable sealing means 55 are associated with the flanges 54 for engagement with partition 15.

As mentioned above, a tank R positioned in lower chamber 13' contains a store of material to be processed, usually in liquid form. A feed line 32 has its lower end dipping into the bottom of tank R and leads to the intake of a pump P1. The discharge line 29 from the pump extends upwards through a hole in the partition 15 and its upper end is inclined to discharge at a point situated above the uppermost tray of the stacked assembly 16 when the frame 21 is placed in the upright position as shown in FIG. 2. When pump P1 is operated to deliver liquid from the store R to the pipe 29, the liquid discharged by the pipe falls into the uppermost tray 16, filling the tray to the brim (or up to a predetermined depth as will be later described), then overflows into the next lower tray, which it fills in turn, and so on. The liquid thus cascades down the stack of trays 16, filling them successively with metered charges of liquid to be processed. After all the trays of the stack have been filled, the operation of pump P1 is arrested. Any excess liquid overflowing from the lowermost tray of the stack is collected in a funnel 30 and flows back over a return pipe 30' to the reservoir R. The funnel 30, or collector plate, is fitted in an opening 18 formed in the partition wall 15 beneath the lower end of the stack 16 (when in upright position).

Means are provided for creating a vacuum around the trays 16 after they have been filled with metered charges of liquid and the hood 31 has been lowered into position around the stack and into sealing engagement with the partition 15. A vacuum pump unit 60 is positioned in the lower chamber 13' and has an intake pipe 62 connected with the outlet of a condenser 33 also positioned in the lower chamber. A vacuum pipe 33' extends from the top of condenser 33 and projects upwards through the collector funnel 30 so as to open into the bottom of the space defined by hood 31 when in lowered sealing position around the stack of trays 16.

Means are also provided for circulating temperature-control fluid in heat-exchange relationship with each of the trays in the stack 16. The circulating means, later described in greater detail, include a flexible conduit 28 connecting with the stack 16 so as to allow for the pivotal displacements of said stack, said conduit 28 being connected at its other end with inlet and discharge manifolds for cooling and/or heating fluids, not shown. It will be understood that in the operation of the system, with the hood 31 lowered into sealing position around the charged trays 16, a cooling fluid may first be circulated through conduit means 28 to freeze the aqueous constituent of the composition contained in the trays. Then vacuum pump 60 may be operated to generate a vacuum about the trays, of a degree sufficient to sublimate the ice (or other frozen liquid) in the trays. The resulting vapour is drawn by the vacuum pump through line 33' into condenser 33 where the vapour re-condenses to ice. The sublimation process is advantageously accelerated by cutting off the circulation of cooling fluid from conduit 28 and applying a heating fluid instead.

After the sublimation process has been continued a time sufficient to bring the treated substance to the desired degree of dryness, vacuum pump 60 is arrested, and the interior of hood 31 is vented to the surrounding atmosphere through a suitable vent valve not shown. The hood 31 is then raised, manually or preferably mechanically, over its guide means 31' to the elevated position shown in FIGS. 1 and 2. The frame 21 is rotated manually or mechanically about its pivot 17 to bring it to the tipped position shown in FIG. 1. The dry solid contents of the trays 16 is then discharged therefrom by the discharge means now to be described.

As shown, a discharge opening 19 is formed in the partition 15 in a position to underlie the lower ends of the intervening spaces between the trays 16 when the stack of trays is in the tipped position. A funnel 35 disposed in the opening 19 has its bottom outlet opening into the top of a casing 56 which may contain a suitable crusher device such as the pair of crusher rolls schematically shown. The base of the crusher casing 56 connects by way of a chute 58 with suitable receiver means 37, in this embodiment the casing of a compacting machine including a vertically reciprocable compacting piston as schematically shown. It will be understood that instead of or in addition to the crusher device 56 and compacting machine 37, any other suitable receiving and output means, such as product-metering and packaging machinery, may be connected to the outlet of funnel 35.

A sliding gate or valve 41 is arranged across the outlet of funnel 35 to seal off the funnel from the crusher device 56.

To facilitate the discharge of the dehydrated solids from the tipped tray assembly 16, means are provided according to this embodiment of the invention for shaking the tray assembly in tipped position. For this purpose there is shown a vibrator device in the form of an eccentric cam roller 34 journalled in opening 19 across a side of the funnel 35 in such a position that the frame 21 when rotated to its tipped position will rest upon the cam roll 34 near the side of said frame remote from the side from which the pivot arm 17' projects. Thus, rotation of the cam roll 34 by any suitable means, manual or preferably mechanical, will impart vibratory jigging motion to the tipped frame 21 and the trays supported therefrom about the pivot axis 17, whereby the dehydrated solids contained in the trays will be positively shaken out and will drop down the vertical spaces between the trays into the funnel 35 and thence through the open gate 41 into the crusher device 56 and thence through chute 58 into the receiver device 37.

Discharge of the solids out of the tipped trays 16 can also be facilitated if the tray surfaces are preliminarily coated with suitable anti-adherent compositions, which should of course be of a nature compatible with the processed substance. Starch, magnesium dioxide, and talc, have been found suitable for this purpose. Permanent anti-adherent coatings may also be used, such as ethylene fluoride and chloro-fluoride base polymers.

In the illustrated embodiment, means are provided for cleaning the empty trays 16 after discharge of the product therefrom and while the tray assembly is still in the tipped position. For this purpose there is shown a washing hood 38 slidable on vertical guide means between an elevated position (FIG. 4) in which it is raised to a sufficient elevation to clear the upper end of the frame 21 during its rotational displacement, and a lowered position (FIG. 1) in which the hood 38 encases the tray assembly 16 in its tipped or discharge position. Extending across the upper part of the hood 38 is a perforate pipe 39 which is connected to a flexible hose 40 connectable at its other end outside the chamber 13 to a source of cleansing fluid under pressure, not shown. In this example, the cleansing fluid is a suitable aqueous solution. After discharge of the product from the trays in the manner described above, the gate valve 41 is displaced (leftward as here shown) to seal the bottom outlet of funnel 35 and jets of cleansing liquid under pressure are discharged through the perforations in pipe 39 to stream down the vertical surfaces of the trays and flush them clean. The cleansing liquid collecting in the bottom of funnel 35 over the closed gate 41 is discharged over a pipe 42 by means of a pump P2 to any suitable disposal, not shown, outside the enclosure A. If desired, means not shown may be provided for thereafter discharging heated air under pressure into the hood 38 for drying out the trays and the funnel 35, prior to raising the washing hood 38 and rotating the tray assembly frame 21 to its upright position for a fresh processing cycle.

Suitable constructions for the tray assembly 16 will now be described.

Figure 5:
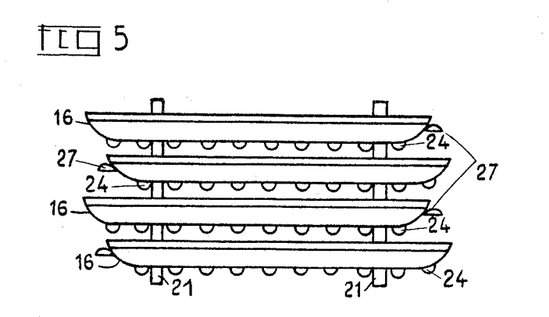
FIG. 5 is a large-scale view in elevation showing part of the tray assembly of the invention in one embodiment thereof.
Figure 10:
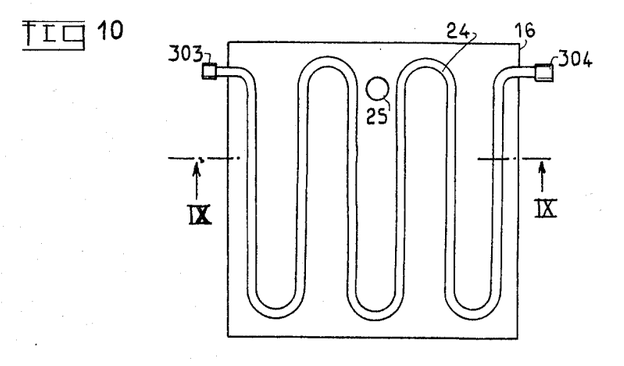
FIG. 10 is a plan view of FIG. 9 from below.

In the embodiment shown in FIG. 5, the stacked trays 16, only four of which are shown, are supported by suitable means from vertical frame members constituting part of the frame 21. Each tray 16, made from suitable rigid and noncorrodible material, e.g. stainless steel, has flow passages 24 for temperature-control fluid associated with its under surface. The passages 24 may comprise a length of sinuous tubing welded to the bottom of the tray (as shown in FIG. 10 later described), or may comprise an integral press-shaped plate having the requisite channel formations stamped therein and welded to said bottom surfaces. Opposite extremities of the channels 24 associated with each tray are adapted to be connected with the flexible piping 28 in a manner later described.

As will be apparent from FIG. 5, the trays 16 are alternately staggered in opposite directions, and are provided at alternately opposed sides with convex overflow weirs 27 struck out of the sides of the trays at accurately determined elevations above the bottom surface of the tray. Owing to the afore-mentioned staggering, the overflow weir 27 of each tray overlies the surface of an underlying tray. In this manner the desired cascading of the liquid during charging can be obtained.

Figure 6:
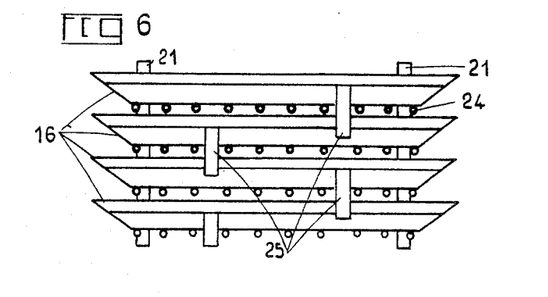
FIG. 6 is a similar view showing another embodiment of the tray assembly.

In the embodiment shown in FIG. 6, the trays 16 are vertically aligned rather than being staggered. In this case the overflow means for each tray is provided in the form of a vertical tube 25 fitted through the bottom of the tray, so as to discharge into the underlying tray. Each tray will thus be filled to a depth accurately determined by the elevation to which its overflow tube 25 protrudes above its bottom surface.

Figure 7:
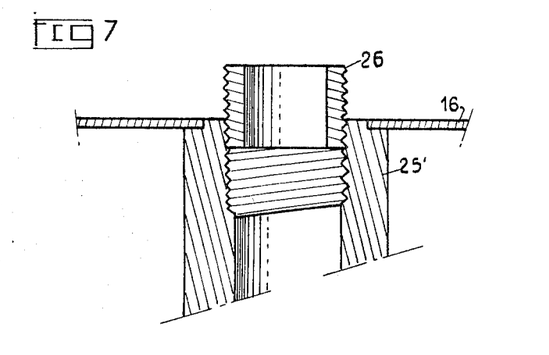
FIG. 7 is a detail sectional view on a yet larger scale showing an adjustable overflow device according to a preferred modification of the tray assembly shown in FIG. 6.

In a desirable modification of this embodiment, the overflow means associated with each tray is made adjustable so as to permit of adjusting the depth of the charge taken by the tray during the charging operation. Thus, as shown in FIG. 7, the overflow tube designated 25 in FIG. 6 is made in two parts, the lower section 25' being fixedly secured in an opening of the tray 16 and projecting downward therefrom, and the upper tube section 26 being externally screw-threaded so as to be adjustably engageable with an internal screw thread provided in the upper part of lower tube section 25'. This threaded adjustment will permit of independently adjusting or readjusting the depth to which each tray will be filled and hence the amount of the metered charge automatically received by it during the cascading charging process.

Figure 8:
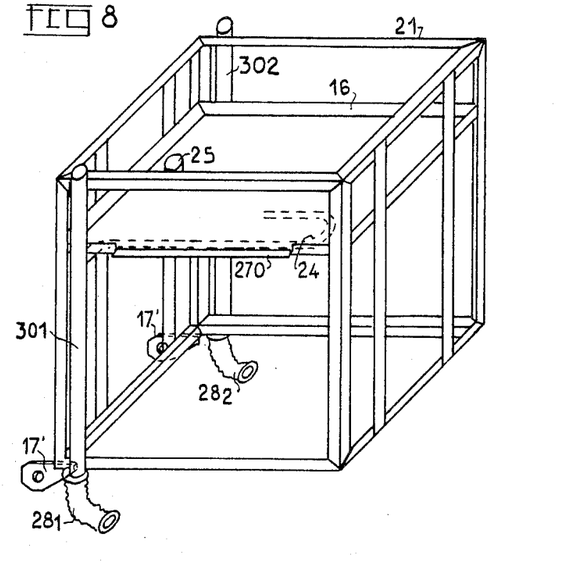
FIG. 8 is an isometric view of one construction of the rotatable frame having all but one tray removed therefrom.

In FIG. 8, the rotatable frame 21 adapted to support the trays therein is shown as composed of twelve angle and four vertical lateral members welded together to form an open box structure. The pair of pivot arms 17' are shown welded to adjacent lower corners of the structure in mutual alignment. A pair of inlet and outlet manifolds in the form of rigid, straight tubes 301 and 302 are secured as by welding along the adjacent vertical sides of the frame 21 adjacent the pivot arms 17'. At their lower ends the manifolds 301 and 302 connect with the flexible tubes 281 and 282 which together constitute the flexible piping 28 previously described as being connected with the temperature-control fluid flow circuit.

Figure 9:
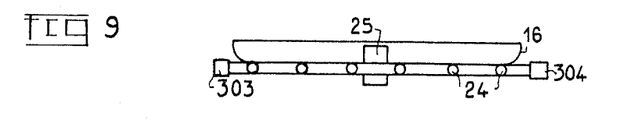
FIG. 9 is a vertical view of a tray used in conjunction with the rotatable frame of FIG. 8, in section on the line IX—IX of FIG. 10.

Referring both to FIG. 8 and to FIGS. 9 and 10, it will be seen that in this construction the fluid flow passages 24 associated with each tray 16 are in the form of a sinuous tube welded to the bottom of the tray, and having outwardly projecting inlet and outlet connectors 303 and 304. When the trays 16 are mounted in position in the frame 21, the end connectors 303, 304 are suitably joined with spaced points of the manifolds 301 and 302 respectively. The trays in this construction are provided with overflow means in the form of vertical tubes 25 as in FIG. 6 or FIG. 7, and there is further provided an overflow weir 270 as a precautionary measure.

The tray container construction described has important advantages. First, the heat transfer relationship between the substance contained in the trays and the temperature-control fluid is greatly improved owing to the fact that the fluid circulation passages or coils are directly associated with the individual trays. The importance of this feature will be understood from the following considerations.

In any process in which heat is to be abstracted from or supplied to a substance at the same time as the substance is being exposed to a high vacuum, as in the processes of the class to which the invention relates, transfer of heat from and to the substance raises a difficult problem. Of the three basic modes of heat transfer made available by nature, namely convection, radiation and conduction, it is clear that the first, convection is useless in the circumstances since the presence of a vacuum precludes the presence of a convecting fluid. Heat transfer by radiation can be and often is employed for supplying heat to the substance, but this method is efficient only if the temperature of the radiating heat source is relatively high. The presence of a high-temperature heating source and the consequent high temperature gradients present in the apparatus inevitably bring the danger of local superheating and hot points in the heated surfaces. As a result, radiation heat transfer is undesirable in all cases where the treated substance is temperature-sensitive and liable to be destroyed by even moderate temperature elevations, as is the case with many organic substances such as foodstuffs and pharmaceutical compositions.

The remaining mode of heat transfer, conduction, in order to be efficient, requires an extremely intimate contact between a large surface of the treated substance and a corresponding surface of the heating or cooling means. This condition has usually been filled in conventional apparatus by accurately machining the flat under surface of the container for the substance, and positioning it upon the accurately machined flat surface of a heating or cooling table containing fluid circulating means therein. Such an arrangement, in addition to being relatively expensive, will only remain effective so long as both surfaces in mutual engagement are maintained perfectly flat. However, mechanical impacts incident to handling, and especially thermal expansion and contraction effects, combine to render some distortion of the mutually engaging surfaces unavoidable during service. Even a minute relative distortion of one of two mutually engaging planar surfaces results in a separation between the surfaces over large areas. Heat transfer then becomes highly inefficient while simultaneously there arises a risk of dangerous local over-heating in the limited remaining areas of contact. These difficulties are entirely eliminated by the arrangement of the invention wherein the piping for circulating the temperature-control fluid is directly associated with the bottom surface of each tray-like container, rather than being associated with a table surface upon which the container rests. Perfectly intimate contact and excellent heat conduction thus remain ensured for indefinite periods of time. The added expense of the provision of the fluid circulating channels under the containers is amply offset by elimination of any accurately machined surfaces and reduction in maintenance costs.

Another essential advantage of the arrangement described resides in the ease and rapidity with which all the tray-like containers can be charged with metered amounts of the substance to be processed, by simple cascading overflow between the stacked trays. In conventional processing apparatus of the type concerned, it was usual to move the trays disposed in a horizontally spaced serial array over a conveyor or the like, past a filling station. If it was desired to fill the respective trays with accurately metered, uniform, charges of substance, metering valve or feeder means had to be provided at the filling station, and operated on and off for each tray moving therepast. These complications are completely eliminated, and the charging process is vastly simplified and expedited, through the arrangement of the invention wherein the trays are all charged in a single step without any relative motion between the trays and the delivery nozzle, and without having to turn the nozzle on and off or provide a metering feeder, while still achieving a uniform charging of all the trays with accurately predeterminable amounts of the substance. This is obtained by the simple and practical expedient of cascaded overflow between stacked trays, preferably combined with the adjustable overflow tube means 25 as described.

Coupled with this improved charging arrangement, the bodily rotation of the assembly of stacked trays or shelves over a 90° arc between the upright and tipped positions shown in FIGS. 2 and 1, affords additional advantage. Whereas in the upright condition of the stack the horizontally lying trays are in the proper position to be charged by the cascade-overflow method of the invention and permit treatment of the material charged therein, in the tipped condition the vertical trays are optimally positioned for discharging the solid product substance and, optionally, flushing the trays. As a result of the provision for bodily tipping the stack of trays or shelves, the invention thus achieves a reduction of the number of different stations to the minimum number of two, and the movement of the trays between these two stations is effected simultaneously in the simplest possible way, which minimizes handling operations and eliminates conveyor equipment, while achieving maximum output capacity for the plant.

Figure 11:
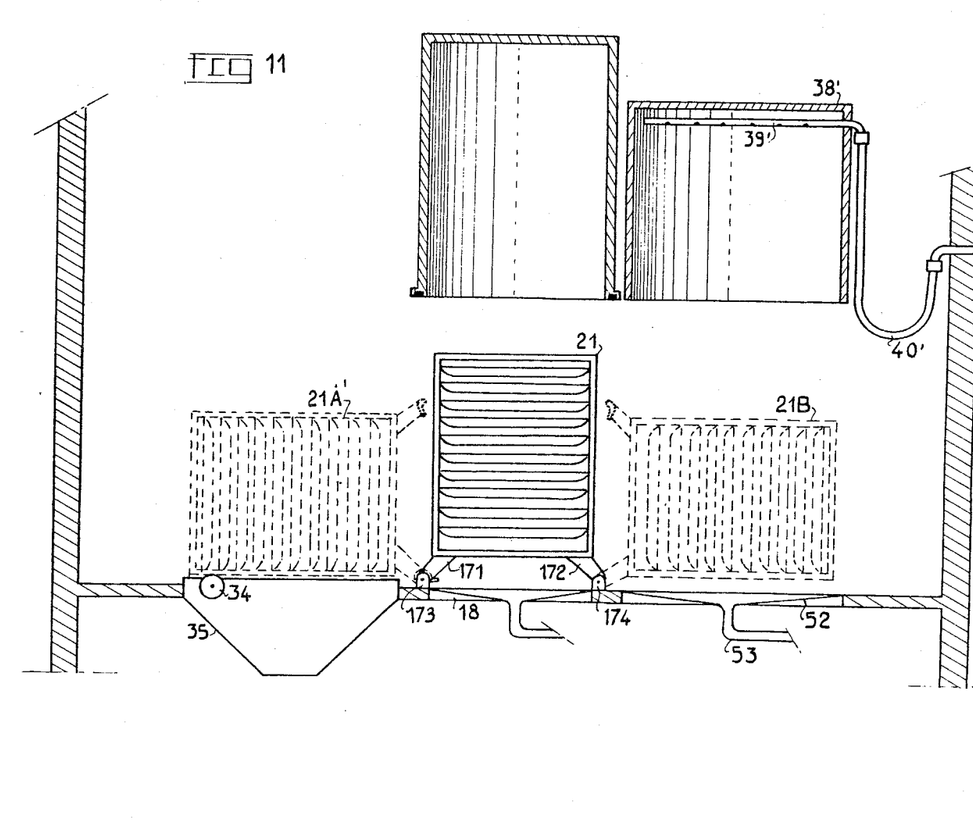
FIG. 11 is a simplified vertical view (similar to FIG. 1) of another freeze-drying installation according to an embodiment of the invention using three different positions of the rotatable frame rather than only two.

In some cases, it may be found desirable to discharge the product from the trays, and wash the empty trays, at separate stations. Such a modification of the invention is illustrated in FIG. 11, where it will be seen that the frame 21 supporting the stacked trays or shelving is provided with two legs 171 and 172 projecting oppositely from its bottom corners and pivotally engageable with respectively related pivot brackets 173 and 174 upstanding from the horizontal partition 15 on opposite sides from the opening 18 therein. Releasable latching means, not shown, are associated with the pivot brackets 173 and 174 whereby each of the arms 171 and 172 can be selectively latched and released for and from pivotal engagement with the related bracket. It will be apparent that the tray-supporting frame 21 can thus be selectively tipped from its upright central position, shown in full lines, to either of its oppositely tipped positions indicated in dashed lines respectively at 21A and 21B. In the tipped position 21A, the vertical trays overlie the discharge hopper 35 for discharge of the solid product from the trays through actuation of the vibrator roll 34 as previously described. In the other tipped position 21B, the vertical trays overlie a funnel 52 inserted in a related opening formed in the partition 15, and connected to a discharge pipe 53 for washing liquid, leading to a disposal not shown. The washing hood, designated 38′, fitted with its washing-liquid discharge pipe 39′ connected to flexible hose 40′, is here arranged to overlie the tipped stack of trays when in the washing position 21B. The operation of this embodiment of the invention will be evident from earlier explanations and need not be described in detail. This embodiment, while being slightly more complicated than the one first described, may be found advantageous in certain applications in that it avoids wetting the discharge hopper or funnel 35 during the washing step.

Figure 12:
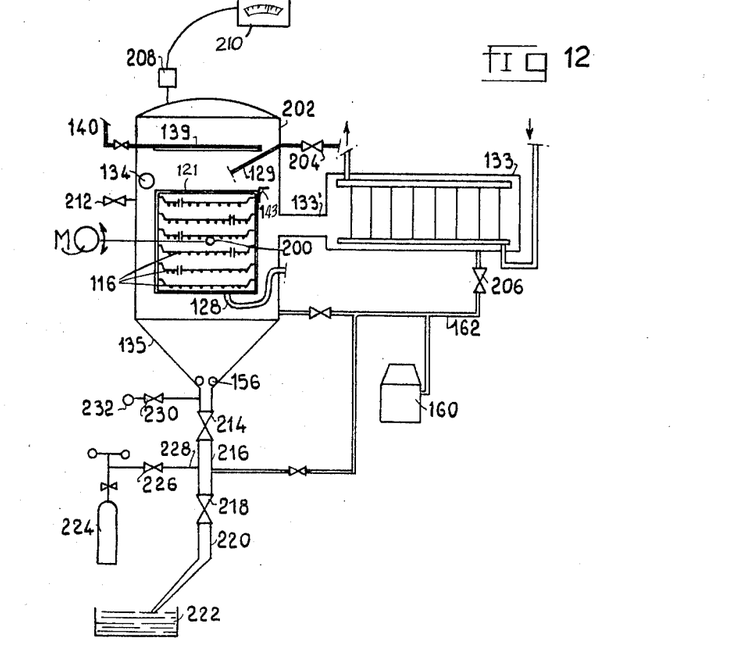
FIG. 12 is a schematic vertical view of yet another freeze-drying installation according to a preferred embodiment of the invention wherein the rotatable frame is pivoted about a central axis rather than a side axis; the tray assembly is shown in its upright position.
Figure 13:
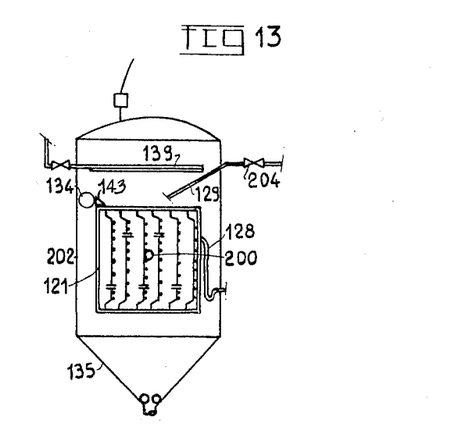
FIG. 13 shows the vacuum vessel of FIG. 12 with the tray assembly in tipped position.

A further and currently preferred embodiment of the invention is illustrated in FIGS. 12 and 13, in which parts corresponding in function to parts present in the first embodiment are designated by the same reference numbers plus one hundred.

In this instance the rotatable frame 121 supporting the stacked trays or shelves 116, which may be generally similar to the tray assemblies earlier described is mounted for rotation about a pivot shaft 200 extending through the center of the frame and stack of trays therein. The rotatable frame 121 is mounted within a sealable pressure enclosure in the form of a cylindrical steel vessel 202 having a domed top and a funnel-shaped bottom end 135. The pivot shaft 200 is journalled by suitable means across a diameter of the cylindrical body of vessel 202 and said diameter is large enough to clear the corners of frame 121 during rotation of the frame between its upright position (FIG. 12) and tipped position (FIG. 13) about the central pivot shaft 200. Any suitable means, manual or automatic, may be provided for rotating the frame 121 between its upright and its tipped positions, and in FIG. 12 such means are schematically indicated as a reversible electric motor M.

The liquid substance to be freeze-dried is supplied by way of a pipe 129 the outlet of which overlies the uppermost tray 116 when the stack is in the upright position, said pipe 129 being connected by way of a valve 204 with a suitable source of the substance.

The vessel 202 can be evacuated by way of a vacuum line 133' leading to a condenser 133 connected by a line 162 having a valve 206 therein to a vacuum pump 160.

Temperature control liquid is supplied to and from the trays 116 in the manner earlier described by means of flexible conduits 128 which are led out of tank 202 through a sealed connection to a suitable fluid flow circuit not shown.

A perforate pipe 139 extends into the upper part of vessel 202 and is connected through a valve with a conduit 140 leading to a source of washing fluid, not shown, it being noted that in this embodiment conduit 140 is rigid rather than having to be flexible as was the corresponding washing fluid conduit 40 in the first embodiment.

A pressure gauge 208 connected to the upper part of vessel 202 is connected with an indicating instrument 210. A vent valve 212 is also shown connected with a side of the vessel for venting its interior to the atmosphere.

Vibrator cam 134 suitably journalled within the vessel 202 is adapted to engage a bracket 143 projecting from the frame 121 in the tipped position of the frame (FIG. 10).

A crusher 156 for the dried product is provided in the form of a pair of crusher rollers journalled across the outlet of the base funnel outlet 135 of the vessel 202. The funnel outlet below the crusher 156 leads to a lock device which includes a lock input gate valve 214, followed by lock chamber 216 followed by lock output gate valve 218. This latter leads to a product discharge pipe 220 discharging into a receiver 222.

For reasons later explained means are provided to deliver an atmosphere of suitable gas such as nitrogen into the lock chamber 216 and comprise a pressure gas reservoir 224 connected with chamber 216 by way of valve 226 and line 228.

The general operation of the freeze-drying apparatus shown in FIGS. 12 and 13 is entirely similar to that of the apparatus shown in FIGS. 1–4, and will be further clarified by the ensuing example, which will simultaneously serve to illustrate the practical performance of the invention.

EXAMPLE

In a practical embodiment of the apparatus schematically shown in FIGS. 12 and 13 used for the freeze-drying of skim milk, the frame 121 supported a stack of thirty trays 116 each 1.50 meters square in plan contour and 22 millimeters deep, spaced 50 mm. apart. The stack was thus about 1.50 m. high, providing a generally cubic assembly.

The vacuum vessel 202 had a cylindrical body section 2.50 m. diameter and 3 m. high. The frustoconical bottom funnel 135 was 0.75 m. deep while the domed top had a vertical chord of 0.20 m., so that the total capacity of the vacuum enclosure was 16 cubic meters.

The overflow nozzles of all the trays were adjusted so that the trays were all charged to a depth of 15 mm. It will be noted that this advantageously small depth of the liquid charge to be subjected to freeze-drying is made possible by the relatively very large total surface area simultaneously exposed to vacuum in the stack of thirty trays, i.e. $30 \times 1.5^2 = 67.5$ sq. m. The total charge present in the trays per treating cycle is somewhat greater than 1 cubic meter or one metric ton.

The skim milk was stored in overhead storage containers (not shown) maintained at a temperature of about $+4°$ C. and provided with agitators for homogenization, and was delivered through pipe 129 by gravity. The fat content of the skim milk was about 10 grams per liter.

At the time of charging, the interior of vessel 202 was held at a pressure of 6 torr, which is approximately the vapour pressure of milk at 4° C. The charging step proceeded in the manner earlier described, with the milk cascading down the stacked trays so as to fill each tray with an accurately metered charge 15 mm. deep. The excess milk from the bottom tray was discharged through means not shown in FIGS. 12 and 13.

After the trays 116 were filled with the prescribed charge of skim milk, cooling liquid at a temperature of $-30°$ C. was circulated through the piping 128 and the associated flow passages of the trays. The temperature control liquid used was a 1/1 water/glycol mixture and was cooled to the indicated temperature in a separate and conventional cooling plant not shown.

The charge of skim milk quickly froze and after about one hour circulation of the cooling liquid the milk reached a temperature of $-25°$ C. At this point the flow of cooling liquid was cut off and the vacuum pump 160 was connected to apply a vacuum of 0.1 torr through condenser 133 to the interior of vessel 202 by means of the valving shown. As will be noted from the temperature/time graph of FIG. 14, where the instant of vacuum application is indicated as the point A on the time axis, the temperature of the milk thereupon dropped a few additional degrees to about $-27°$ C. due to the action of the vacuum.

Figure 14:
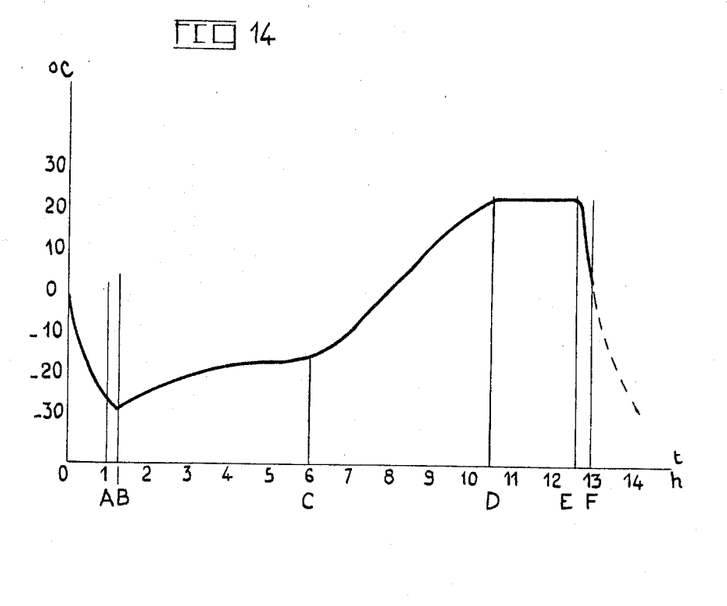
FIG. 14 is a graph illustrating a typical freeze-drying cycle usable with the apparatus of the invention.

At this point, point B on the graph, the frozen mass can be considered completely free from any liquid particles therein, and the freeze-drying stage proper, or sublimation stage, of the process is commenced. The flow and temperature of the temperature control liquid was controlled so as to provide in the charge of solid milk a temperature cycle in accordance with the indicated graph. From point B to point C about five hours later, the temperature was increased slowly from $-27°$ C. to about $-15°$ C., then from point C to point D (about 4½ hrs.) the rate of temperature rise in the charge was increased until the temperature reached about $+25°$ C., and the temperature was then held stationary at this value for about two hours (point E).

During the controlled application of heat under vacuum, commencing at point B, the charge of frozen milk exposed to vacuum in the trays 116 is subjected to sublimation, that is, the particles of ice therein are directly converted to vapour without passing through the liquid state, and the vapour is discharged through pipe 133' to condenser 133 where it recondenses. The ultimate stage of the cycle conducted at relatively high constant temperature (to point E) is a final evaporation stage and is found necessary to remove the moisture down to a final residual value of 2% water content, leaving the skim milk in the form of a dry powder in the trays. The flow of temperature control liquid in piping 128 was then cut off.

Frame 121 was rotated about shaft 200 to the tipped position shown in FIG. 10. Most of the milk powder dropped into the bottom of funnel 135, and vibrator 134 was operated for a short time to remove residual powder clinging to the trays. It is noted that owing to the presence of vacuum in the enclosure the powder particles drop without creating flying dust.

Lock inlet valve 214 was then opened and crusher device 156 was operated to pass the milk powder into lock chamber 216 in the form of a free-flowing powder product. When the full charge of milk powder had been collected in the lock chamber, nitrogen valve 216 was opened to fill the lock chamber with nitrogen at atmospheric pressure, while avoiding a danger of oxidation. Lock outlet valve 218 was finally opened to discharge the product to receiver 222.

The subsequent processing including the packaging of the milk powder is conventional and will not be here described, but it will be understood that the receiver tank 222 here shown by way of example may be replaced with any desired processing apparatus, such as metering and packaging machinery.

After the milk product has been discharged out of the vessel 202, valve 140 is operated to deliver washing liquid through pipe 139 and flush the trays 116 in their vertical tipped condition. First however, the vent valve 212 is opened to put some air into the vessel, to a pressure of about 24 torr which is the vapor pressure of water at 25° C., the temperature of the washing water used. The washing water which has streamed down the trays 116 collects in funnel 135 and is discharged by way of valve 230, opened at this time, and pump 232. The frame 121 can then be rotated back to its upright processing position (FIG. 9) and the described cycle can be repeated.

It will be noted from the graph that the freeze-drying cycle described has a duration of about 13 hours, and that the freeze-drying unit shown in FIGS. 9 and 10 therefore has a production rate of about 1.85 metric tons per 24-hour day.

It will be appreciated that the freeze-drying plant of any of the embodiments herein disclosed, in addition to (and as a consequence of) the advantages earlier indicated, is outstandingly well-suited for automatic operation. The individual actions or steps involved in the performance of the process cycle, including essentially the rotation of the tray-supporting frame between its upright and tipped positions, the operation of the various valves and pumps and the vibrator device (and the raising and lowering of the hoods in the first embodiment disclosed), can all be controlled with very great simplicity by automatic or semi-automatic means and/or by remote control, should this be desirable.

What we claim is:

1. Freeze-drying apparatus comprising:
   a frame having a set of trays supported in parallel-spaced stacked relation therein;
   pivot means connected with the frame for rotating the frame about a generally horizontal axis between a first, charging-and-freeze-drying position in which the stacked trays are disposed horizontally in vertically-spaced relation and and a second, discharging position in which the trays are disposed generally vertically in horizontally-spaced relation;
   a sealable enclosure surrounding the frame and set of trays at least in said first position of the frame;
   a charging line connectable with a source of material to be freeze-dried and connected with the enclosure for charging all the trays with metered charges of material;
   means connected with the enclosure for exposing the trays to prescribed low-pressure and temperature conditions for freeze-drying the charges of material therein;
   receiver means positioned to underlie the spaces between the vertically-disposed trays when the frame is in said second position to receive freeze-dried material therefrom;
   and means for moving the frame alternately between its positions for a charging-and-freeze-drying stage, and a discharging stage, respectively, of a freeze-drying cycle.

2. Apparatus for subjecting a fluent material to a cyclic process involving prescribed vacuum and temperature conditions, comprising:
   a frame having a set of trays supported in parallel-spaced stacked relation therein;
   overflow means associated with the respective trays operative to cause fluent material poured into one tray to flow to an underlying tray after the material has attained a prescribed depth in said one tray;
   pivot means associated with the frame for rotating the frame between a first position in which the trays are horizontal in vertically-stacked relation and a second position in which the trays are generally vertical in horizontally-spaced relation;
   a sealable enclosure surrounding the frame and set of trays at least in said first position of the frame;
   a charging line connectable with a source of fluent material to be processed and having an outlet overlying an uppermost one of said trays in the enclosure when the frame is in said first position whereby said material will cascade down the stack by way of said overflow means and will fill each tray with a metered charge of material to a prescribed depth;
   means connected with the enclosure for exposing the trays to prescribed pressure and temperature conditions for processing the charges of material in the trays;
   receiver means positioned to underlie the spaces between the vertically disposed trays when the frame is in the second position to receive processed material therefrom; and
   means for alternately moving the frame between said positions for a charging-and-processing stage, and a discharging stage, of the cyclic process.

3. The apparatus defined in claim 2, wherein the overflow means associated with each tray is adjustable to determine the depth of the metered charge of material in each tray.

4. The apparatus defined in claim 2, wherein the overflow means associated with each tray comprises a generally vertical tube providing a flow passage through the tray and threadedly adjustable to vary the elevation of the upper end of the tube above the surface of the tray.

5. The apparatus defined in claim 2, wherein said means for exposing the trays to prescribed conditions comprise
   a vacuum line connectable with a source of vacuum and connected with said enclosure; and
   conduit means connectable with a source of temperature-control fluid and connected with the individual trays, said conduit means being deformable to permit rotation of the frame between said positions.

6. The apparatus defined in claim 2, wherein said means for exposing the trays to prescribed conditions comprise fluid flow passages permanently associated with the individual trays and extending alongside the under surface thereof, and conduit means connectable with a source of temperature control fluid and connected with said passages of the respective trays to pass said fluid in close heat-transfer relation with the charges of material in the trays, said conduit means being deformable to permit rotation of the frame between said positions.

7. Freeze-drying apparatus comprising:
   a sealable vessel having a bottom outlet;
   a frame in said vessel having a set of trays supported in parallel-spaced relation therein;
   overflow means associated with the respective trays operative to cause fluent material poured into one tray to flow to an underlying tray after the material has reached a prescribed depth in said one tray;
   pivot means mounting the frame for rotation in said vessel about a generally horizontal axis between a first position in which the trays are horizontal in vertically-stacked relation and a second position in which the trays are generally vertical in horizontally spaced relation;
   a charging line connectable with a source of fluent material to be freeze-dried and having an outlet in said vessel overlying an uppermost one of said trays when the frame is in said first position whereby said material will cascade down the stack by way of said overflow means and will fill said trays with metered charges of material to prescribed depths;
   a vacuum line connectable with a source of vacuum and connected with said enclosure;
   temperature control means associated with said trays for exposing the charges of material therein to a prescribed low-temperature cycle when the frame is in said first position;
   receiver means positioned to underlie said bottom outlet of the vessel so as to receive freeze-dried material from said trays when the frame is in said second position; and
   means for alternately moving the frame to said first position prior to a charging-and-freeze-drying stage and moving the frame to said second position prior to a discharging stage of a cyclic freeze-drying process.

8. The apparatus defined in claim 7, wherein said temperature control means comprise conduit means connectable with a source of temperature-control fluid and connected with all of said trays for passing said fluid in heat-transfer relation with the charges of material therein, said conduit means being deformable to permit said rotation of the frame.

9. The apparatus defined in claim 7, wherein said axis extends substantially through the center of the frame.

10. The apparatus defined in claim 7, including a flushing line connectable with a source of washing fluid and having an outlet in said vessel overlying said frame whereby with the frame in its second position the washing fluid will stream down the generally vertical surfaces of the trays to flush the same.

11. Freeze-drying apparatus comprising:
an enclosure and means for circulating a conditioned atmosphere through the enclosure;
a frame in said enclosure having a set of trays supported in parallel spaced stacked relation therein;
pivot means mounting the frame for rotation in said enclosure about a generally horizontal axis off-center with respect to the frame between a first position in which the trays are horizontal in vertically-stacked relation and a second position horizontally displaced from the first position in which the trays are vertical in horizontally-spaced relation;
overflow means associated with the respective trays operative to convey material poured into one tray into the underlying tray after the material has reached a prescribed depth in said one tray;
a charging line connectable with a source of material to be freeze-dried and having an outlet positioned above an uppermost one of said trays when the frame is in said first position whereby said material will cascade down the stack by way of said overflow means to fill all the trays with metered charges of material to prescribed depths;
means connected with the enclosure for exposing the charged trays to prescribed pressure and temperature conditions for freeze-drying the charges of material in the trays when the frame is in said first position;
a discharge opening in the base of said enclosure positioned to underlie the spaces between the vertical trays when the frame is in said second position and receiver means underlying said opening to receive freeze-dried material discharged from the trays; and
means for alternately moving the frame to said first position preparatory to a charging-and-freeze-drying stage and to said second position preparatory to a discharging stage of a cyclic freeze-drying process.

12. The apparatus defined in claim 11, further comprising a bell-like hood vertically displaceable in said enclosure between a lower position in which it sealingly surrounds the frame when in said first position and an upper position clear of the frame, and means for applying vacuum to the interior of said hood when in said lower position.

13. The apparatus defined in claim 11, further comprising a flushing line connectable with a source of washing fluid and having an outlet in said enclosure overlying said frame when the frame is in said second position whereby the washing fluid will stream down the generally vertical surfaces of the trays to flush the same.

14. The apparatus defined in claim 11, including means for rotating the frame about said axis to a third position which is generally symmetrical to said second position with reference to a vertical plane containing said axis, a flushing line connectable with a source of washing fluid and having an outlet overlying said frame when the frame is in said third position whereby the washing fluid will stream down the generally vertical surface of the trays to flush the same.

15. The apparatus defined in claim 11, comprising a housing, a horizontal partition dividing the housing into an upper and a lower compartment, said upper compartment constituting said enclosure, said discharge opening is formed through said partition, and said lower compartment contains said receiver means.

16. The apparatus defined in claim 2, including vibrator means engageable with the frame when the frame is in its second position and operable to promote the discharge of freeze-dried material from the trays into the receiver means.

References Cited by the Examiner
UNITED STATES PATENTS

| | | | |
|---|---|---|---|
| 2,441,021 | 5/1948 | Heineman | 34—92 |
| 2,710,456 | 6/1955 | Andersen | 34—92 |
| 2,969,111 | 1/1961 | Bocognano | 34—92 |
| 3,184,862 | 5/1962 | Frank | 34—92 |

WILLIAM J. WYE, *Primary Examiner.*